(12) United States Patent
Froehlich

(10) Patent No.: US 12,285,883 B1
(45) Date of Patent: Apr. 29, 2025

(54) LOG SPLITTER TOOL

(71) Applicant: Allan F. Froehlich, West Allis, WI (US)

(72) Inventor: Allan F. Froehlich, West Allis, WI (US)

(*) Notice: Subject to any disclaimer, the term of this patent is extended or adjusted under 35 U.S.C. 154(b) by 372 days.

(21) Appl. No.: 18/096,776

(22) Filed: Jan. 13, 2023

(51) Int. Cl.
| | |
|---|---|
| *B27L 7/04* | (2006.01) |
| *B27G 15/00* | (2006.01) |
| *B27L 7/00* | (2006.01) |
| B23B 51/00 | (2006.01) |
| B23G 5/06 | (2006.01) |
| B23G 7/02 | (2006.01) |
| F16B 25/00 | (2006.01) |

(52) U.S. Cl.
CPC ............... B27L 7/04 (2013.01); B27L 7/005 (2013.01); *B23B 51/0081* (2013.01); *B23G 5/06* (2013.01); *B23G 7/02* (2013.01); *B23G 2200/28* (2013.01); B27G 15/00 (2013.01); *F16B 25/0047* (2013.01); *F16B 25/0078* (2013.01)

(58) Field of Classification Search
CPC .......... B27L 7/005; B27L 7/04; B27G 15/00; B27G 15/02; B23B 51/0081; B23B 51/009; B23G 5/06; B23G 7/02; B23G 2200/28; B23G 2200/34; B23G 2200/40; B23G 2200/48; F16B 25/0047; F16B 25/0078
USPC ........... 144/193.1, 194, 195.5, 366; 470/198, 470/204; 411/416
See application file for complete search history.

(56) References Cited

U.S. PATENT DOCUMENTS

| | | | | |
|---|---|---|---|---|
| 3,246,556 A | * | 4/1966 | Phipard | F16B 25/0084 |
| | | | | 470/84 |
| 4,091,851 A | * | 5/1978 | Ober | B27L 7/04 |
| | | | | 144/193.1 |
| 4,252,166 A | * | 2/1981 | Kozicki | B27L 7/04 |
| | | | | 144/194 |
| 4,301,847 A | * | 11/1981 | Stickler | B27L 7/04 |
| | | | | 144/194 |
| 4,561,277 A | | 12/1985 | Taubert et al. | |
| 6,705,364 B2 | * | 3/2004 | Ellison | B27L 7/04 |
| | | | | 144/194 |
| 2008/0166195 A1 | * | 7/2008 | Gentry | B23B 51/009 |
| | | | | 408/224 |
| 2022/0242005 A1 | * | 8/2022 | Chlapek | B27B 17/0016 |

* cited by examiner

*Primary Examiner* — Jared O Brown
(74) *Attorney, Agent, or Firm* — Donald J. Ersler

(57) ABSTRACT

A log splitter tool preferably includes a splitter portion and a drive portion. The splitter portion includes a modified cone shape with a concave curved profile formed on a side. A cross section of the cone shape preferably has a twisting three-lobe shape. A helical three-lobe contact thread is formed in the modified cone outer surface. The three-lobe contact thread preferably has angular spacing between each lobe of greater or less than 120-degrees. The three-lobe contact thread preferably has a constant pitch. The size of each thread preferably decreases in size from a bottom of the modified cone to a top of thereof. A top of the modified cone is preferably terminated with a self-drilling tip. The drive portion extends from a bottom of the cone portion. A second embodiment preferably includes a drive shaft rotatably retained in a handle.

19 Claims, 6 Drawing Sheets

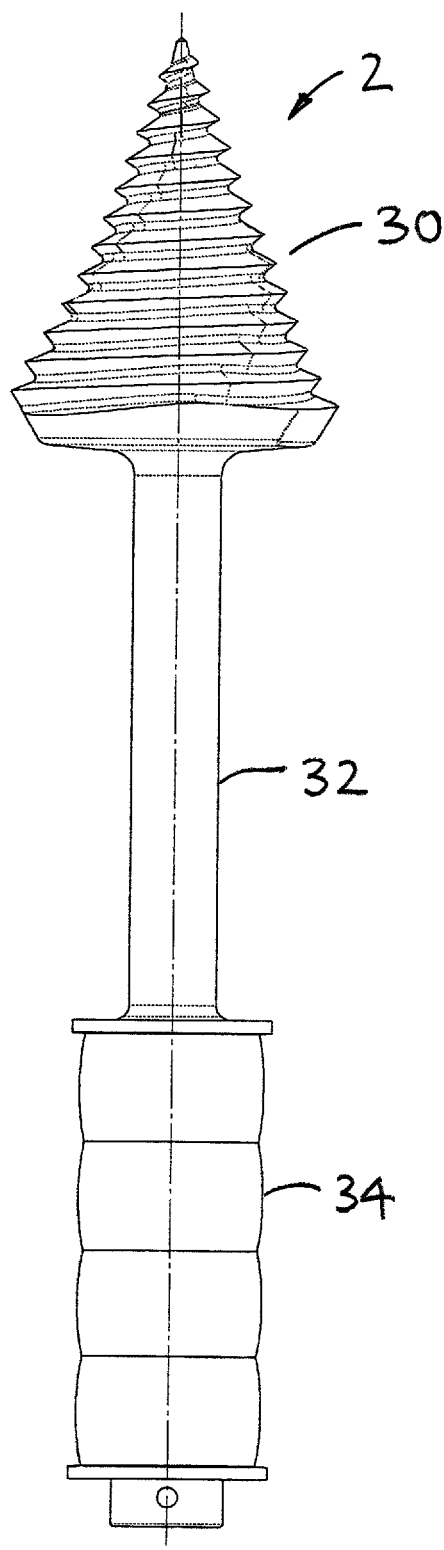
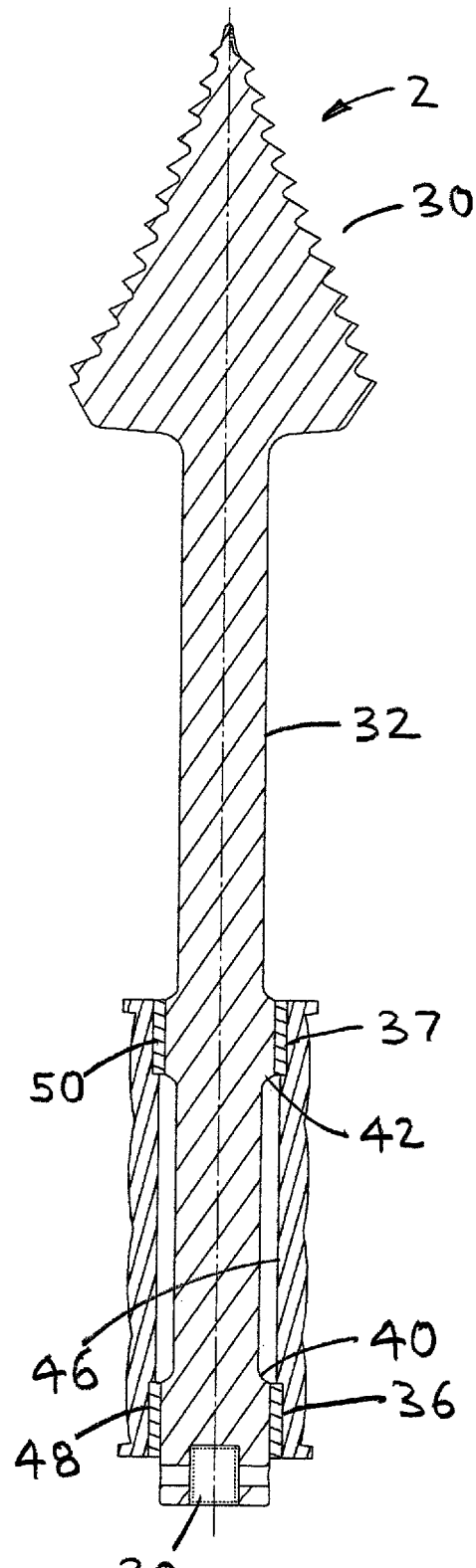
FIG. 9
FIG. 10

LOG SPLITTER TOOL

BACKGROUND OF THE INVENTION

1. Field of the Invention

The present invention relates generally to making firewood and more specifically to a log splitter tool, which requires less torque to operate that of the prior art.

2. Discussion of the Prior Art

Existing log splitting tools go by many names, such as wood splitting screw, wood splitting auger and wood splitting cone. The prior art log splitting tools typically include a conical thread. The thread shape is simple to manufacture, but the design has many drawbacks. The existing log splitting tools are typically sized below two inches in diameter and are retained in a handheld drill due to the torque required to operate them. Larger versions of the log splitting tools require rigid fixturing to position thereof and to prevent the log from spinning when the log splitting tool engages the log. The conical thread design is prone to over-heating due to the constant contact with the log that is being split. It is common for the existing log splitting tools to get so hot, that the log starts smoking. The heat of the existing log splitting tool accelerates wear of the screw threads.

Accordingly, there is a clearly felt need in the art for a log splitter tool, which requires less torque to operate that of the prior art, which includes a perimeter shape that makes variable contact instead of constant contact with a log, such that it generates less heat and which causes the log to split more rapidly; and the log splitter tool may also be used as a demolition tool, such as an axe or prying tool.

SUMMARY OF THE INVENTION

The present invention provides a log splitter tool, which requires less torque to operate that of the prior art, and which includes a perimeter shape that makes variable contact with a log to be split. The log splitter tool preferably includes a splitter portion and a drive portion. The splitter portion includes a modified cone shape with a concave curved profile formed on a side, instead of a straight line to form a modified cone outer surface. Additionally, a cross section of the cone shape has a non-circular shape. Specifically, the cross section of the cone preferably has a twisting three-lobe shape. However, a helical lobe shape with four or more lobes could also be used. The twisting three-lobe shape reduces the amount of contact with a log to be split, relative to a round shape, which is always in contact with the log. The three-lobe shape is accomplished by joining ends of three curved portions with three curved outer lobes. A helical three-lobe contact thread is formed in the modified cone outer surface.

The helical three-lobe contact thread could be described as a "variable curtate trochoid curve." The curtate trochoid follows a conical helix with a constant pitch and a variable radius. U.S. Pat. No. 4,561,277 to Taubert et al. (Taubert) is hereby incorporated by reference in its entirety to describe a three-lobe shape. However, Taubert discloses a three-lobe thread having equally spaced lobes. The multiple-lobe contact thread preferably does not have equally spaced lobes. The angular spacing between each lobe is preferably greater than or less than 120 degrees. The greater or less than 120 angle between each lobe would provide less contact with a log being split, by staggering the outermost contact area as the three-lobe contact thread continues along an outer surface of the modified cone outer surface to a top of thereof. The three-lobe contact thread preferably has a constant pitch, but a non-constant pitch could also be used. A size and height of each thread preferably decreases from a bottom of the modified cone to a top of thereof. It is preferable that the three-lobe contact thread has a "V" shape. However, other shapes of threads may also be used. A top of the modified cone is preferably terminated with a self-drilling tip. The self-drilling tip is well known in the art and need not be explained in detail. The drive portion extends from a bottom of the cone portion. A square cavity is preferably formed in a bottom of the drive portion to receive a square drive member of an impact wrench or a ratchet. However, the cavity may also have other shapes, such as a hex.

A second embodiment of a log splitting tool preferably includes a splitter portion, a drive shaft, a handle and two sets of bearings. The splitter portion is the same as the splitter portion of the first embodiment. The drive shaft extends from a bottom of the splitter portion. A drive cavity is formed in an end of the drive shaft. The drive shaft has a length, which accommodates the handle. A first bearing support extends outward from an outer diameter of the drive shaft, near a bottom of the drive shaft. A second bearing support extends outward from the outer diameter of the drive shaft, above the first bearing support 40. The handle includes an outer perimeter and an inner diameter 46. A first bearing bore is formed in a bottom of the handle to receive the first bearing. A second bearing bore is formed in a top of the handle to receive the second bearing. The handle is rotatably supported relative to drive shaft with the first and bearings. The drive cavity is sized to receive a drive projection of an impact device, a drill or a ratchet.

Accordingly, it is an object of the present invention to provide a log splitter tool, which requires less torque to operate that of the prior art.

It is a further object of the present invention to provide a log splitter tool, which includes a perimeter shape that makes variable contact instead of constant contact with a log.

It is an additional object of the present invention to provide a log splitter tool, which generates less heat than that of the prior art.

It is yet a further object of the present invention to provide a log splitter tool, which includes a rotating handle.

Finally, it is another object of the present invention to provide a log splitter tool, which causes the log to split more rapidly.

These and additional objects, advantages, features and benefits of the present invention will become apparent from the following specification.

BRIEF DESCRIPTION OF THE DRAWINGS

FIG. 9 is a side view of a second embodiment of a log splitting tool in accordance with the present invention.

FIG. 10 is a side cross-sectional view of a second embodiment of a log splitting tool in accordance with the present invention.

DETAILED DESCRIPTION OF THE PREFERRED EMBODIMENTS

Figure 1:
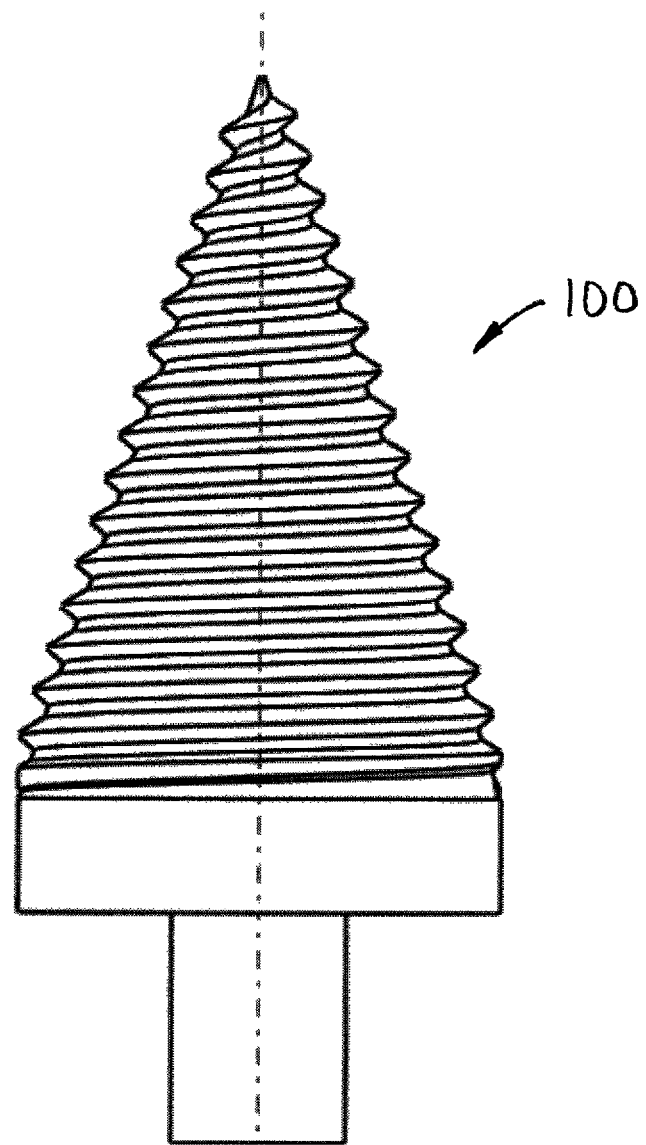
FIG. 1 is a perspective view of a prior art log splitting tool.
Figure 2:
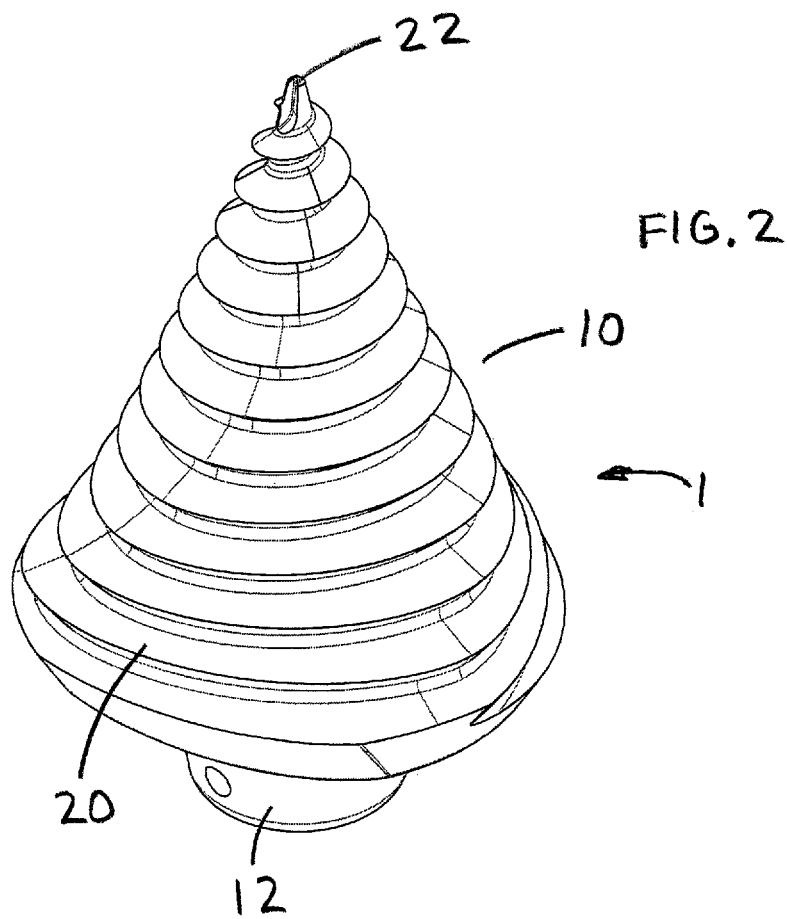
FIG. 2 is a top perspective view of a log splitting tool in accordance with the present invention.

With reference now to the drawings, and particularly to FIG. 1, there is shown a perspective view of a prior art log splitting tool 100. With reference to FIG. 2-5, the log splitter tool 1 preferably includes a splitter portion 10 and a drive portion 12. The splitter portion 10 preferably includes a modified cone shape with a concave curved profile 14 formed on a side, instead of a straight line to form a modified cone outer surface. Additionally, a cross section of the cone portion 10 has a non-circular shape. Specifically, the cross section of the cone portion 10 preferably has a twisting three-lobe shape. However, a twisting lobe shape with four or more lobes could also be used. The twisting three-lobe shape reduces the amount of contact with a log to be split, relative to a round shape, which is always in contact with the log. The three-lobe shape is accomplished by joining ends of three curved portions 16 with three curved outer lobes 18. The three curved outer lobes 18 make most of the contact with the log. A helical three-lobe contact thread 20 is formed in the modified cone outer surface. The helical three-lobe contact thread 20 could be described as a "variable curtate trochoid curve." The curtate trochoid follows a conical helix with a constant pitch and a variable radius.

U.S. Pat. No. 4,561,277 to Taubert et al. (Taubert) is hereby incorporated by reference in its entirety to describe a three-lobe shape. However, Taubert discloses a three-lobe thread having equally angularly spaced lobes. The helical three-lobe contact thread 20 preferably does not have equally angularly spaced lobes 18. The angular spacing between each lobe is preferably greater than or less than 120 degree. The following dimension is given by way of example and not by way of limitation. A satisfactory value for angle "A" has found to be 124 degrees. An angle of greater than or less than 120 degrees between each lobe would provide less contact, when a log is being split by staggering the lobe 18 of each adjacent thread as the helical three-lobe contact thread 20 continues along an outer surface of the modified cone outer surface to a top of thereof. The angle of greater than or less than 120 applies varying splitting pressure and movement, increasing the speed at which the log or object is split. The helical three-lobe contact thread 20 preferably has a constant pitch, but a non-constant pitch could also be used. A size and height of the helical three contact thread 20 preferably decreases from a bottom of the cone portion 10 to a top thereof. It is preferable that the helical three-lobe contact thread 20 has a "V" shape. However, other shapes of threads may also be used. A top of the cone portion 10 is preferably terminated with a self-drilling tip 22. Self-drilling tips 22 are well known in the art and need not be explained in further detail. With reference to FIG. 3a, a quick release hex shank 15 extends from a bottom of the cone portion 10, instead of a drive portion 12.

Figure 6:
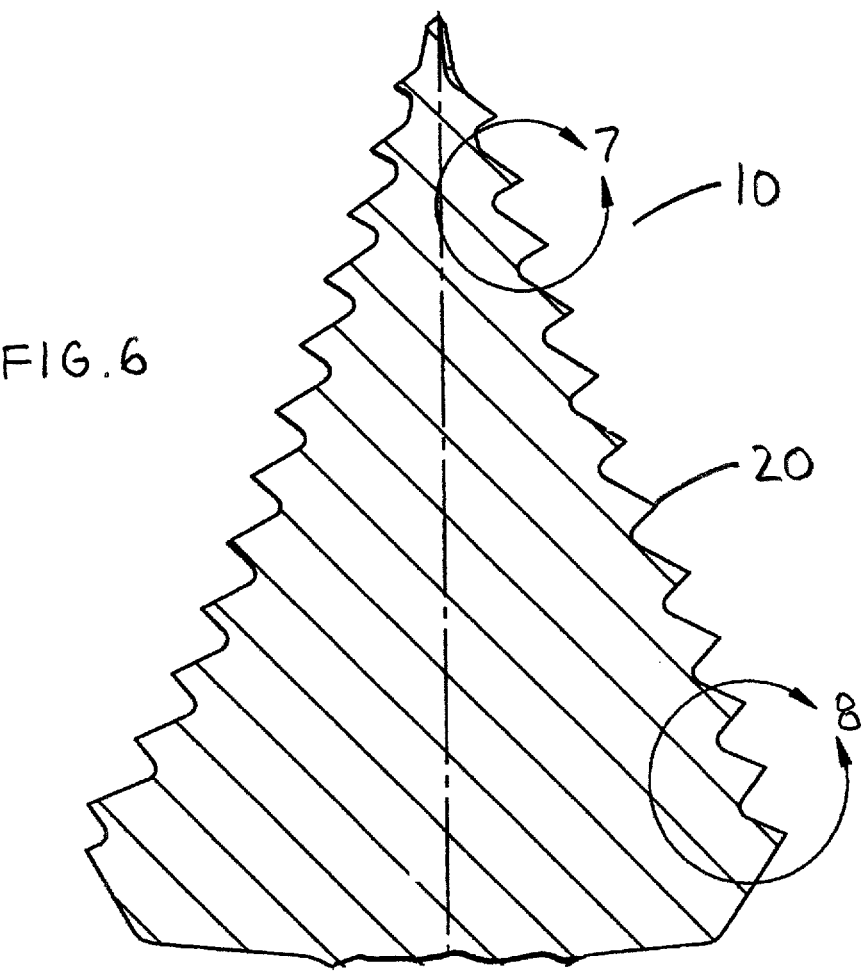
FIG. 6 is a cross sectional view of a cone portion of a log splitting tool, cut through FIG. 5 in accordance with the present invention.
Figure 7:
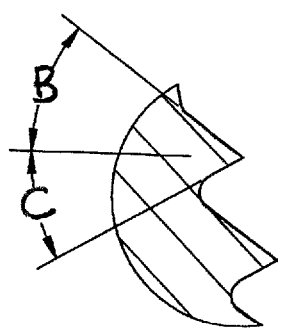
FIG. 7 is an enlarged cross-sectional view of a top of a cone portion of a log splitting tool taken from FIG. 6 in accordance with the present invention.
Figure 8:
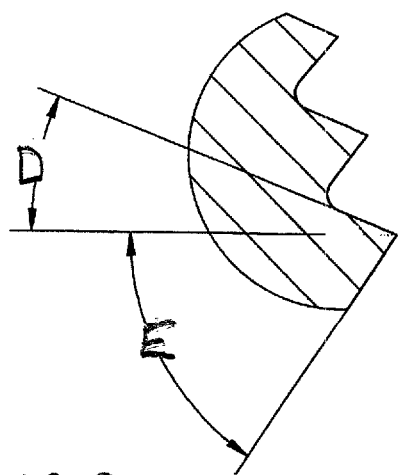
FIG. 8 is an enlarged cross-sectional view of a bottom of a cone portion of a log splitting tool taken from FIG. 6 in accordance with the present invention.

With reference to FIG. 6, the helical three-lobe contact thread 20 changes from a tip to a bottom thereof. The purpose of the variable thread 20 is to reduce wear on the sharp edge by increasing the contact area of the thread face on the wood. With reference to FIG. 7, the contact threads 20 below the self-drilling tip 22 include lead angle B and relief angle C. Angle B preferably has a range of x-y degrees. Angle C preferably has a range of z-y degrees. The angles B, C pull the log splitter tool 1 into the wood. With reference to FIG. 8, the contact threads 20 above a bottom of the splitter portion 10 include lead angle D and relief angle E. Angle D preferably has a range of x-y degrees. Angle E preferably has a range of z-y degrees. The thread 20 will slowly transition from the thread angles B, C near the tip of the splitter portion 10 to the thread angles D, E near the bottom of the splitter portion 10.

Figure 3:
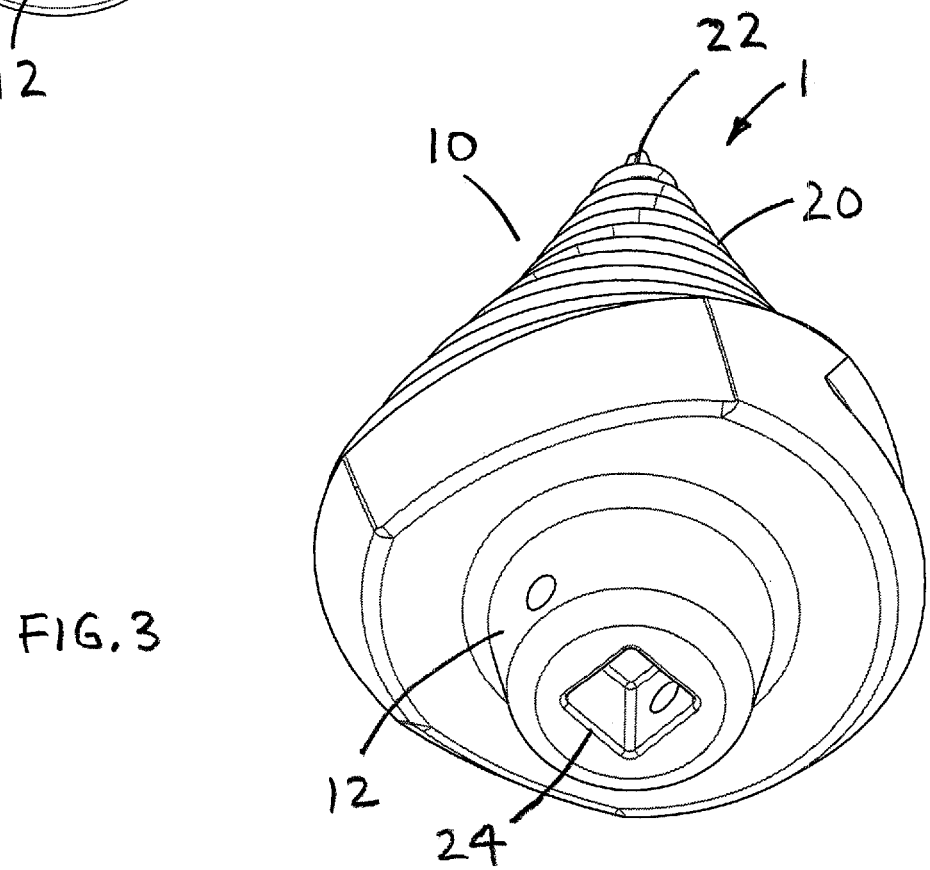
FIG. 3 is a bottom perspective view of a log splitting tool in accordance with the present invention.
Figure 3A:
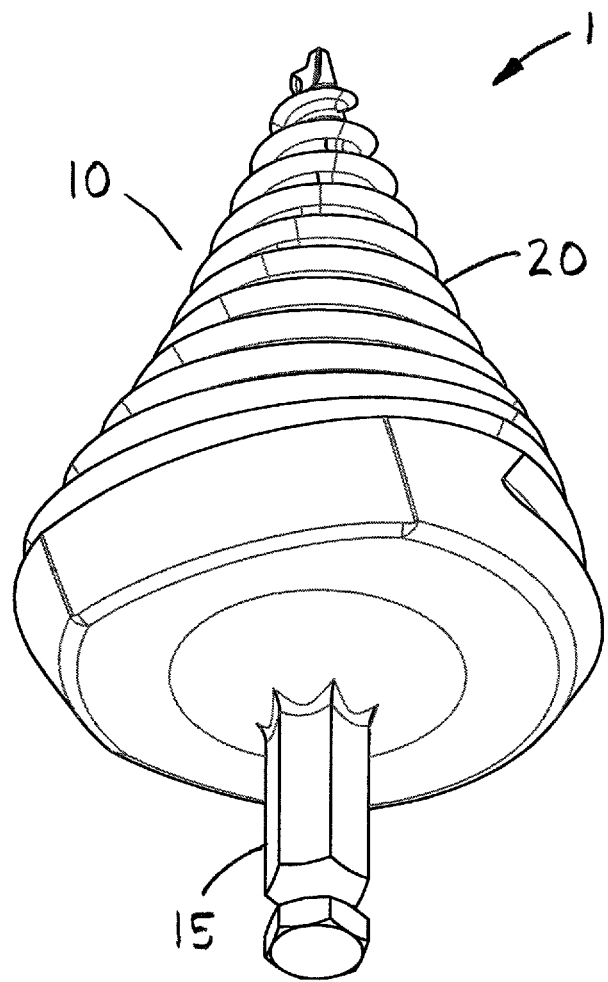
FIG. 3a is a bottom perspective view of a log splitting tool with a quick release hex shank in accordance with the present invention.
Figure 4:
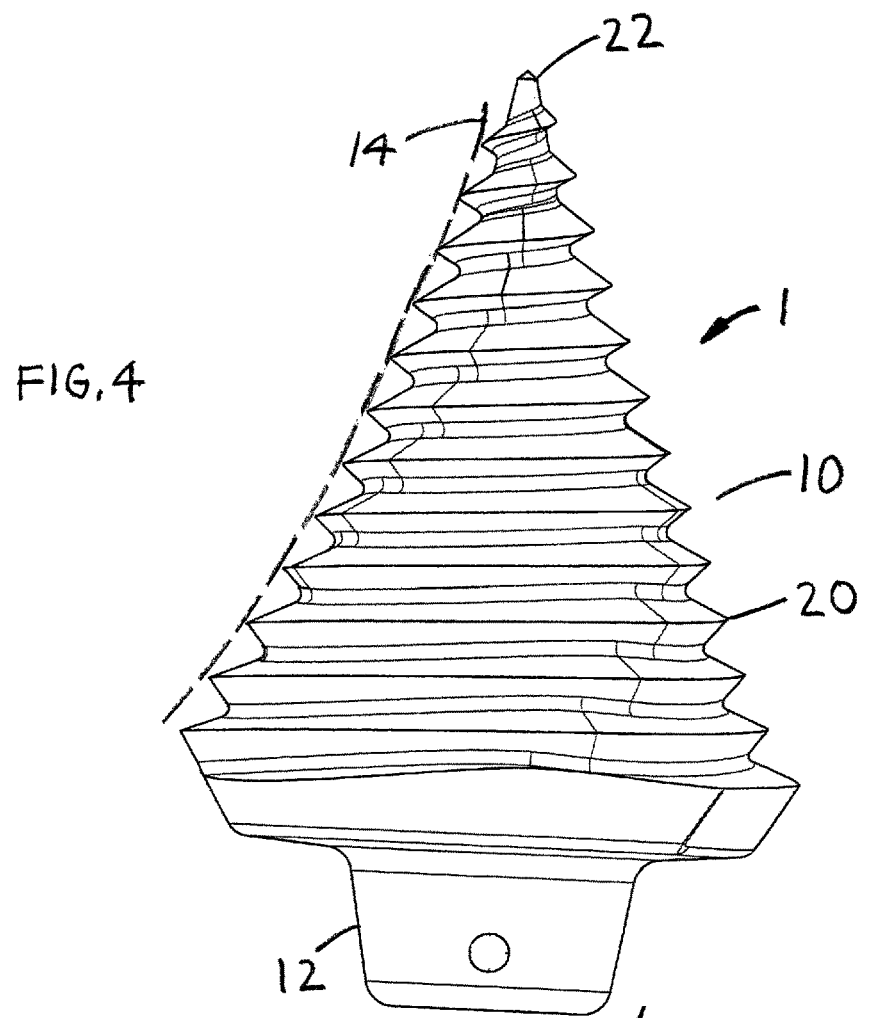
FIG. 4 is a side view of a log splitting tool in accordance with the present invention.
Figure 5:
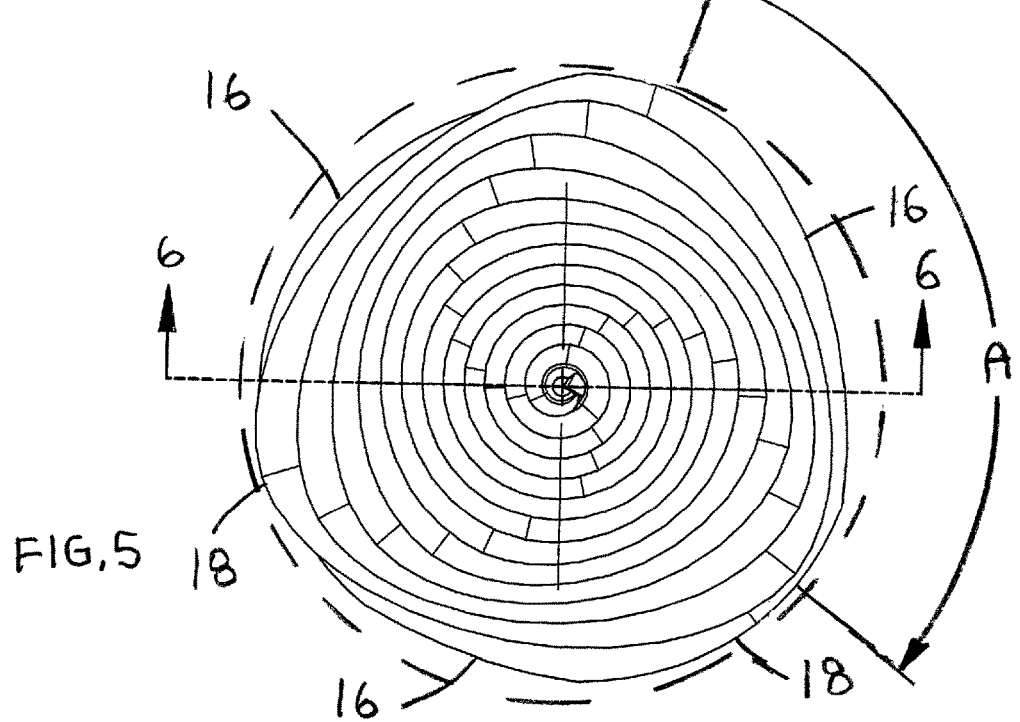
FIG. 5 is a top view of a log splitting tool in accordance with the present invention.

With reference to FIG. 3, a square cavity 24 is preferably formed in a bottom of the drive portion 12 to receive a square drive member of an impact wrench or a ratchet. The square cavity 24 preferably follows the standard ASA B5.38 1958. It functions with both friction-ring impact drives and ball-detent impact drives (the perpendicular through-hole catches the ball). However, the drive cavity may also have other shapes, such as a hex. A drive projection with any suitable shape could also extend from a bottom of the splitter portion 10 instead of the drive portion 12. The drive cavity or drive projection could be called a drive element.

With reference to FIGS. 9-10, a second embodiment of a log splitting tool 2 preferably includes a splitter portion 30, a drive shaft 32, a handle 34 and bearings 36, 37. The bearings 36, 37 could be roller bearings, tapered bearings, solid bushings or any other suitable devices. The splitter portion 30 is the same as the splitter portion 10 of the first embodiment. The drive shaft 32 extends from a bottom of the splitter portion 30. A drive cavity 38 is formed in an end of the drive shaft 32. The drive shaft 32 has a length, which accommodates the handle 34. A first bearing support 40 extends outward from an outer diameter of the drive shaft 32, near a bottom of the drive shaft 32. A second bearing support 42 extends outward from the outer diameter of the drive shaft 32, above the first bearing support 40. The handle 34 includes an outer perimeter 44 and an inner diameter 46. A first bearing bore 48 is formed in a bottom of the handle 34 to receive the first bearing 36. A second bearing bore 50 is formed in a top of the handle 34 to receive the second bearing 37. The handle 34 is rotatably supported relative to drive shaft 32 with the first and bearings 36, 37. The handle 34 reduces loading on the impact wrench or driving tool. The drive cavity 38 is sized to receive a drive projection of an impact device, a drill or a ratchet.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A log splitting tool, comprising:
   a substantial cone shaped base including a three-lobe cross section, said three-lobe cross section includes multiple curved portions, adjacent ends of each of said multiple curved portions are joined with a curved outer lobe, said multiple curved lobes extend outward from an outer perimeter of said substantial cone shaped base, an outer perimeter of said multiple curved lobes is greater than an outer perimeter of said multiple curved portions, a helical thread is formed in an outer surface of said substantial cone shaped base, wherein an angular spacing between each of said multiple curved lobes is greater than or less than 120°.

2. The log splitting tool of claim 1, wherein:
said outer perimeter of said substantial cone shaped base includes a concave curved profile.

3. The log splitting tool of claim 1, wherein:
said helical thread is a variable curtate trochoid curve.

4. The log splitting tool of claim 3, wherein:
said variable curtate trochoid curve follows a conical helix with a constant pitch and a variable radius.

5. The log splitting tool of claim 1, wherein:
a size and height of said helical thread decreases from a bottom of said substantial cone shaped base to atop thereof.

6. The log splitting tool of claim 1, wherein:
said helical thread includes a "V" shape.

7. The log splitting tool of claim 1, wherein:
a self-drilling tip is formed on a top of said substantial cone shaped base.

8. A log splitting tool, comprising:
a substantial cone shaped base including a twisting multiple-lobe shaped cross section, said twisting multiple-lobe shaped cross section includes multiple curved portions, adjacent ends of each of said multiple curved portions are joined with a curved outer lobe, said twisting multiple-lobe shaped cross section causes said plurality of curved outer lobes to not be vertically aligned, said multiple curved lobes extend outward from an outer perimeter of said substantial cone shaped base, an outer perimeter of said multiple curved lobes is greater than an outer perimeter of said multiple curved portions, a helical thread is formed in an outer surface of said substantial cone shaped base, wherein said helical thread is a variable curtate trochoid curve; and
a drive element is formed on a bottom of said substantial cone shaped base.

9. The log splitting tool of claim 8, wherein:
said outer perimeter of said substantial cone shaped base includes a concave curved profile.

10. The log splitting tool of claim 8, wherein:
said variable curtate trochoid curve follows a conical helix with a constant pitch and a variable radius.

11. The log splitting tool of claim 8, wherein:
a size and height of said helical thread decreases from a bottom of said substantial cone shaped base to a top thereof.

12. The log splitting tool of claim 8, wherein:
said helical thread includes a "V" shape.

13. The log splitting tool of claim 8, wherein:
a self-drilling tip is formed on a top of said substantial cone shaped base.

14. A log splitting tool, comprising:
a substantial cone shaped base including a multiple-lobe shaped cross section, said multiple-lobe shaped cross section includes multiple curved portions, adjacent ends of each of said multiple curved portions are joined with a curved outer lobe, said multiple curved lobes extend outward from an outer perimeter of said substantial cone shaped base, an outer perimeter of said multiple curved lobes is greater than an outer perimeter of said multiple curved portions, a helical thread is formed in an outer surface of said substantial cone shaped base;
a drive shaft extends from a bottom of said cone shaped base; and
a handle including an inner diameter, said inner diameter is sized to rotatably receive said drive shaft.

15. The log splitting tool of claim 14, wherein:
said outer perimeter of said substantial cone shaped base includes a concave curved profile.

16. The log splitting tool of claim 14, wherein:
said helical thread is a variable curtate trochoid curve.

17. The log splitting tool of claim 14, wherein:
at least two sets of bearings are retained between the handle and the drive shaft.

18. The log splitting tool of claim 14, wherein:
said helical thread includes a "V" shape.

19. The log splitting tool of claim 14, wherein:
a self-drilling tip is formed on a top of said substantial cone shaped base.

* * * * *